United States Patent
Senot et al.

(10) Patent No.: US 9,560,268 B2
(45) Date of Patent: Jan. 31, 2017

(54) METHOD FOR OBTAINING VIDEO CONTENT FROM CAMERAS WHICH RELATES TO A USER OF A COMMUNICATION DEVICE, AND ASSOCIATED APPARATUS

(75) Inventors: Christophe Senot, Nozay (FR); Jérôme Picault, Nozay (FR)

(73) Assignee: Alcatel Lucent, Boulogne-Billancourt (FR)

(*) Notice: Subject to any disclaimer, the term of this patent is extended or adjusted under 35 U.S.C. 154(b) by 403 days.

(21) Appl. No.: 14/004,328

(22) PCT Filed: Mar. 8, 2012

(86) PCT No.: PCT/EP2012/054018
§ 371 (c)(1),
(2), (4) Date: Mar. 14, 2014

(87) PCT Pub. No.: WO2012/120083
PCT Pub. Date: Sep. 13, 2012

(65) Prior Publication Data
US 2014/0218544 A1   Aug. 7, 2014

(30) Foreign Application Priority Data
Mar. 10, 2011  (EP) .................................... 11305258

(51) Int. Cl.
*H04N 21/414* (2011.01)
*H04N 21/6587* (2011.01)
(Continued)

(52) U.S. Cl.
CPC ...... *H04N 5/23222* (2013.01); *H04N 21/2187* (2013.01); *H04N 21/2343* (2013.01);
(Continued)

(58) Field of Classification Search
CPC .................................................. H04N 5/23222
(Continued)

(56) References Cited

U.S. PATENT DOCUMENTS

| 6,931,254 | B1 | 8/2005 | Egner et al. |
| 7,683,937 | B1 | 3/2010 | Blumenfeld |

(Continued)

FOREIGN PATENT DOCUMENTS

| CN | 1365560 A | 8/2002 |
| CN | 1835019 A | 9/2006 |

(Continued)

OTHER PUBLICATIONS

International Search Report for PCT/EP2012/054018 dated May 15, 2012.

*Primary Examiner* — Twyler Haskins
*Assistant Examiner* — Fayez Bhuiyan
(74) *Attorney, Agent, or Firm* — Fay Sharpe, LLP

(57) ABSTRACT

A method is dedicated to the obtaining of video recordings related to a user who has a communication device (EC) capable of connecting to a wireless communications network (RC) and whose position is determinable. This method comprises the following steps: (i) determining the position of the spot where the communication device (EC) is located, (ii) determining whether there is at least one camera (C1) capable of providing video recordings, of a part of an observation area that may include that determined spot, accessible via the communications network (RC), and (iii) in the event that such a camera (C1) is determined, transmitting to the communication device (EC), via the communications network (RC), at least a portion of a video recording made by that camera (C1) while the communication device (EC) is in its observation zone.

22 Claims, 1 Drawing Sheet

(51) Int. Cl.
  *H04N 5/232* (2006.01)
  *H04W 4/02* (2009.01)
  *H04N 21/2187* (2011.01)
  *H04N 21/2343* (2011.01)
  *H04N 21/258* (2011.01)
  *H04N 21/2747* (2011.01)
  *H04L 29/08* (2006.01)

(52) U.S. Cl.
  CPC ... *H04N 21/25841* (2013.01); *H04N 21/2747* (2013.01); *H04N 21/41407* (2013.01); *H04N 21/6587* (2013.01); *H04W 4/021* (2013.01); *H04L 67/16* (2013.01)

(58) Field of Classification Search
  USPC ........................................................ 348/207.1
  See application file for complete search history.

(56) References Cited

U.S. PATENT DOCUMENTS

| | | |
|---|---|---|
| 8,614,730 B2 | 12/2013 | Kim et al. |
| 2003/0108240 A1 | 6/2003 | Gutta et al. |
| 2007/0162942 A1 | 7/2007 | Hamynen et al. |
| 2010/0039511 A1 | 2/2010 | Wang |
| 2010/0158315 A1 | 6/2010 | Martin |
| 2010/0278379 A1* | 11/2010 | Rothschild .............. H04W 4/02 382/100 |

FOREIGN PATENT DOCUMENTS

| | | |
|---|---|---|
| CN | 1901664 A | 1/2007 |
| EP | 1 061 712 A1 | 12/2000 |
| FR | 2 859 557 A1 | 3/2005 |
| WO | WO 01/08417 A1 | 2/2001 |
| WO | WO 2009/044175 A2 | 4/2009 |

* cited by examiner

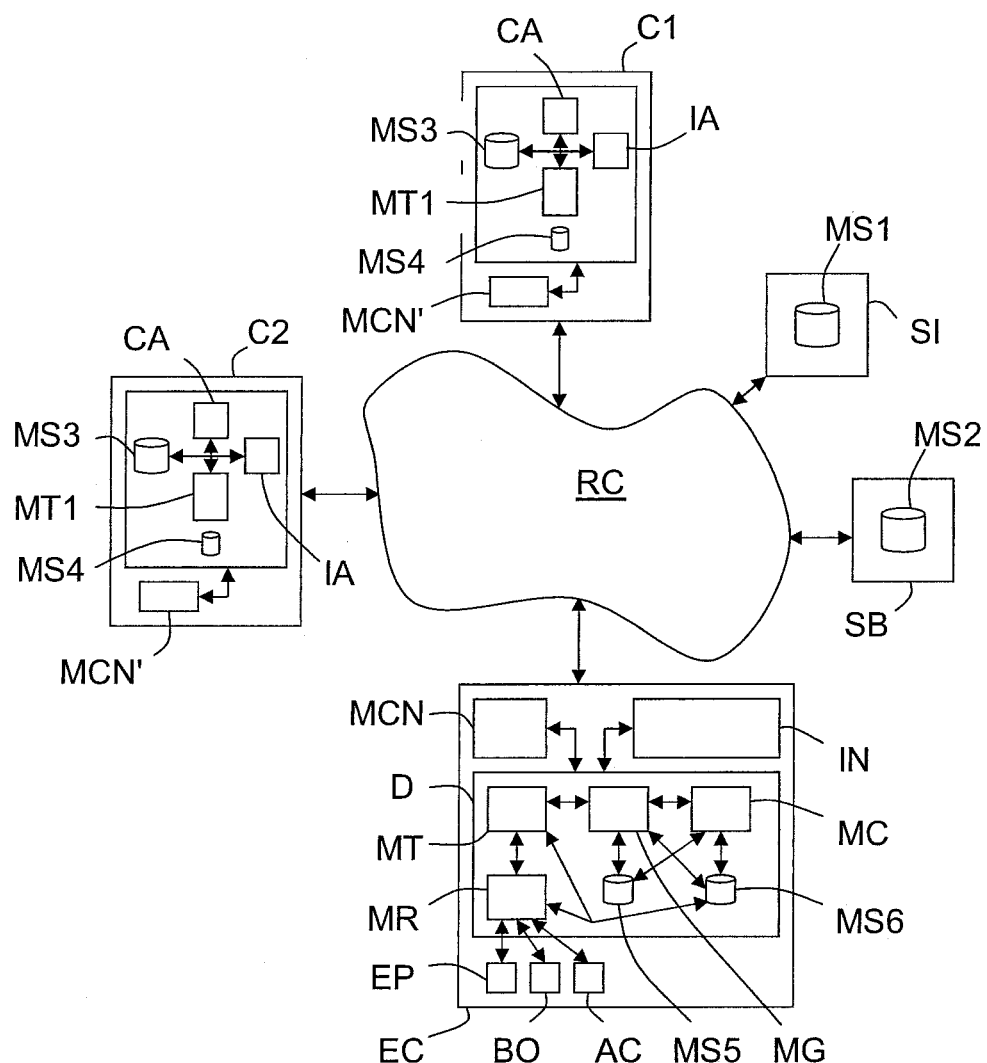

METHOD FOR OBTAINING VIDEO CONTENT FROM CAMERAS WHICH RELATES TO A USER OF A COMMUNICATION DEVICE, AND ASSOCIATED APPARATUS

TECHNICAL FIELD

The invention relates to video recordings which are made by cameras, and more specifically obtaining and potentially using some of these video recordings.

STATE OF THE ART

As is known to a person skilled in the art, certain video cameras make video recordings within observation areas, which may affect some users of mobile communication devices.

Here, "mobile communication device" refers to any machine that has a communication module capable of connecting to at least one wireless communications network, potentially a peer-to-peer network, in order to establish communications with at least one other communication device and/or at least one network device, and also, is capable of presenting video content or signals to its user. It may therefore, for example, be a mobile telephone, potentially a "smartphone", a laptop computer, a personal digital assistant (or PDA), a digital graphics tablet, a communicating monitor, or a communicating gaming console.

Multiple solutions have been proposed to notify a user of the presence of a camera in his or her environment.

It has been proposed in the patent document WO 2010/027772 to detect cameras within an area in which they are prohibited from recording, by taking multiple photographs of that area when it is lit, and then by locating the prohibited cameras based on the particular reflection of their optics.

It has also been proposed in the patent documents GB 2372364 and U.S. Pat. No. 7,398,104 to detect the emissions that some wireless cameras produce when they transmit their video recordings to a wireless communications network.

SUMMARY OF THE INVENTION

The aforementioned known solutions all exhibit at least one drawback. They either require the use of an auxiliary illumination and detection device, which is relatively bulky and expensive, or they only pertain to wireless cameras and therefore cannot detect the presence of wired cameras, which substantially limits their benefit.

Furthermore, no known solution makes it possible to determine whether the user of a (mobile) communication device is actually within a detected camera's observation area, which further limits their benefit. This means that although the user is alerted of the presence of a camera in his or her environment, he or she does not know whether that camera filmed him or her, and therefore if there is a locally stored record of his or her visit. Consequently, the user must first perform several operations with his or her mobile communication device in order to attempt to obtain the detected camera's video recording (provided that he or she is authorized to do so), then must view that video recording afterward with his or her mobile communication device in order to determine whether or not he or she is in that video recording and if that recording concerns him or her. It should be understood that these several operations are restrictive for a user, or even nearly impossible to perform when the user is using his or her mobile communication device for other tasks.

It should be noted that this latter drawback makes it particularly complicated to generate video content within a user's communication device based on a downloaded video recording excerpt that concerns that user. However, such generating may prove useful to some users who have a personal website (or blog), as it allows them to enhance their agglomerated text posts (within a blog) with video content, potentially in an at least partially automated fashion, while protecting their privacy as they desire by means of operations such as deletions or face-blurring, for example.

It is therefore a purpose of the invention to improve the situation, in particular with respect to detecting cameras in the vicinity of a mobile communication device's user.

According to a first aspect, the invention proposes a method devoted to obtaining video recordings related to a user who has a communication device capable of connecting to a wireless communications network and whose position is determinable, and comprising the following steps:
(i) determining the position of the spot where the communication device is located,
(ii) determining whether there is at least one camera capable of providing video recordings, of a part of an observation area that might include the determined spot, accessible via the communications network,
(iii) if such a camera is determined to be present, determining whether the camera offers an observation area that includes said determined position, and if so, and
(iv) transmitting to the communication device, via the communications network, at least part of a video recording made by this camera while the communication device is within its observation area.

The method may comprise other characteristics that may be taken separately or in combination, and in particular:
  during step (ii), the position determined in step (i) may be compared to known camera positions (for example, those declared by their owners (particularly due to a legal requirement) or by collaborative actions of users), which are stored in storage means as matches for camera identifiers, in order to determine if there is a camera that might be located within the vicinity of the communication device, then, if such a camera exists, it may be determined whether that camera offers an observation area that includes the determined position, and if so, step (iii) may be performed using the determined camera's identifier.
  during step (i), the communication device's trajectory may be determined, and during step (ii), it may be determined whether that trajectory will cross the observation area given that communication device's determined position;
  a step (iv) may be provided in which a piece of video content is generated within the communication device based on the transmitted video recording portion, and a step (v) in which that generated video content is provided to a personal website (or blog) of the user in view of providing it, potentially under chosen conditions;
  the step (i) may automatically be carried out at periodic intervals, or upon the request of the communication device's user;
  at least one of the steps (i) to (v) may be carried out based on a set of instructions predefined by the communication device's user;

the instruction data may be chosen from among (at least) a determination period, a systematic storage of video recording portions, potentially after at least one predefined processing effort, a storage of video recording portions based on a predefined context, potentially after at least one predefined processing effort, and the automatic generating and providing of a piece of video content, potentially based on a predefined context;

during step (ii) a camera's observation area may be determined based on information data that relates to that camera and/or to its environment;

the information data may be chosen from among (at least) the camera's aperture angle, the height at which the camera is affixed, the camera's tilt with respect to a horizontal plan, the camera's swivel with respect to a vertical plane, and the configuration of the environment in which the camera is installed;

during step (iii) at least one processing effort of the video recording portion may be carried out based on instructions that were provided by the communication;

during step (iii) at least one processing effort may be carried out within the determined camera based on instructions transmitted by the communication device;

during step (iv) at least one processing effort may be performed within the communication device;

each processing effort may be chosen from among (at least) blurring the faces of people who are detected within the video recording's images, manually and/or automatically selecting at least one sequence of a portion of a video recording when that portion lasts longer than a predefined threshold, deleting a portion of a video recording, and sharing a part of a video recording with at least one third party;

in the presence of a camera that transmits its video recordings to centralized storage means, during step (iii) a search may be performed within these centralized storage means for the video recording of the camera that was determined;

in the presence of a camera that stores its video recordings, during step (iii) one may search for the video recording within that camera;

the communication device's user may be notified when there is a video recording that concerns him or her;

during step (ii) one may authorize the transmission of a portion of a video recording when a predefined set of rule(s) is satisfied;

each rule may be chosen from among (at least) one instituted local rule that relates to the use of video recordings, an authorization to use a video recording in the absence of recognizable third parties or, if permission is provided by a recognizable third party, an authorization to use a video recording when the user of a communication device has a permission to use video recordings that concern him or her, and the providing, by the communication device, of an identifier previously provided when searching for information data related to a camera and/or to that camera's environment.

According to a second aspect, the invention proposes an apparatus devoted to obtaining video recordings made by cameras, for a communication device which is capable of connecting to a wireless communications network and whose position may be determined, and furthermore comprising:

search means operative (or designed) to determined whether there is at least one camera capable of providing video recordings, a part of an observation area that may include a point where the communication device is located, accessible via the communications network, and processing means operative, if such a camera was determined, to request the transmission to the communication device, via the communications network, of at least a portion of a video recording made by that determined camera while the communication device is in its observation area.

Such an apparatus may also potentially comprise generation means configured to generate a piece of video content based on a video recording portion transmitted upon request to the communication device, and control means operative to order the communication device to provide a generated piece of video content to a chosen (personal or group) website in view of making it available, potentially under chosen conditions.

According to a third aspect, the invention proposes a communication device which, firstly, is capable of connecting to a wireless communications network, secondly, possesses a determinable (geographic) position, and thirdly, comprises an apparatus for obtaining video recordings of the type described above.

BRIEF DESCRIPTION OF THE DRAWINGS

Other characteristics and advantages of the invention will become apparent upon examining the detailed description below, and the attached drawing, in which the sole figure very schematically and functionally depicts a communications network to which the following are connected: a user communication device equipped with an apparatus for obtaining video recordings according to the invention; two cameras whose video recordings are accessible; an information server related to the cameras; and a personal website (or blog) server.

The drawing may serve not only to complete the invention, but also to contribute to defining it, if need be.

DETAILED DESCRIPTION

It is a particular object of the invention to enable users of mobile communication devices EC to obtain video recordings (or content) made by cameras Ci and which concern them.

It should be noted that the invention relates to any type of mobile communication device EC, provided that it has a communication module MCN capable both of connecting to at least one wireless communications network RC, potentially a peer-to-peer network, in order to establish communications with at least one other communication device and/or at least one network device, and of playing and using video content. It may therefore, for example, be a mobile telephone, potentially a "smartphone", a laptop computer, a personal digital assistant (or PDA), a digital graphics tablet, a communicating monitor, or a communicating gaming console.

It is assumed in what follows, by way of an exhaustive example, that users' communication devices EC are capable of establishing communications via a mobile (or cellular) communications network. However, the users' communication devices EC may be capable of establishing communications via a peer-to-peer wireless network.

The sole figure depicts a communications network RC to which are connected the following: a user's mobile communication device EC equipped with an apparatus for obtaining video recordings D according to the invention; two cameras Ci (i=1 or 2); a server SI that stores information related to the cameras Ci; and a blog server SB storing, for example, personal websites (or blogs) belonging to different users, including the one who is using the aforementioned mobile communication device EC, or a social network site (e.g. Facebook or similar).

It should be noted in the example depicted in the sole figure, only a single (communication) network RC is depicted. However, the various equipment and servers may be connected to different communications networks interconnected with one another, and particularly to the Internet.

The information that the server SI may store within storage means MS1 may particularly include known (geographic) positions of certain cameras Ci and corresponding camera identifiers.

The positions of the cameras CI may particularly be either declared by their owners, for example due to a legal requirement, or provided by users who discover them collaboratively.

The storage means MS1 may appear in any form known to the person skilled in the art, and particularly in the form of a memory, computer file, or database.

The blog server SB comprises storage means MS2 in which it stores, in this case, personal websites (or blogs) that belong to different users comprising a mobile communication device EC. This blog server SB belongs, for example, to a social network publisher.

The storage means MS2 may be in any form known to the person skilled in the art, and particularly in the form of a memory, computer file, or database.

Each camera Ci is operative to record video images within an observation area that depends on its technical characteristics and on its environment's configuration.

The various characteristics may particularly include the aperture angle, the focal length, the height above the ground at which it is fastened, the tilt with respect to a horizontal plane, and the swivel with respect to a vertical plane.

It should be noted that, "information data" hereafter refers to data that defines a camera's Ci technical characteristics or the configuration of a camera's Ci environment.

Each camera Ci also comprises a communication module MCN' capable of connecting to at least one wired and wireless communication device, particularly for transmitting at least portions of its video recordings.

As depicted, each camera Ci may comprise storage means MS3 in which it stores the digital data that define its information data. These storage means MS3 may be in any form known to the person skilled in the art, and particularly in the form of a memory or a computer file.

However, it is preferable to store within the information server's SI storage means MS1 the information data related to each listed camera Ci as a match for that camera's (Ci) position and identifier. This is because, in this situation, it is possible to obtain with just one query the position, identifier, and information data of a camera Ci.

Each camera Ci may also comprise, as depicted, storage means MS4 in which it stores the digital data, defining each video recording made, as a match for a date and a time. These storage means MS4 may appear in any form known to the person skilled in the art, and particularly in the form of a memory, computer file, or database.

Each camera Ci may also comprise, as depicted, an access interface IA, preferentially an API (Application Programming Interface), which allows a communication device EC or a server for accessing the video recordings which are potentially stored within its storage means MS4.

Each camera Ci may also comprise, as depicted, an access controller CA that enables a communication device EC or a server to access the information data which are potentially stored within its storage means MS3, and/or to control access to the storage means MS4, and/or, as we shall see later on, to control access to a local processing module MT1 tasked with performing, upon request, at least one processing on the video recordings stored within the storage means MS4.

It is important to note that in the example described below, each camera Ci locally stores its video recordings. Consequently, the video recordings must be obtained from the cameras Ci, via their access interface IA and their access controller CA. However, in one variant, the cameras CI may be operative to transmit the video recordings that they make to a server, which is then tasked with storing them in a centralized fashion as matches for their camera identifiers. In this situation, the cameras Ci no longer actually need to comprise an access interface IA and an access controller CA.

It should be noted that if there is centralized video storage, the access interface IA of a camera Ci may make it possible to redirect a user's communication device EC to the video server if that server is not known to that communication device EC (in fact, the access interface may allow transparent access, whether the video storage is local or remote). It should also be noted that semi-distributed or hybrid storage may also be conceived, for example, in different servers associated with different network operators depending on the owners of the cameras Ci, and if so, the access interface IA may enable transparent access.

The invention proposes implementing a method for obtaining video recordings within a communication installation of the type depicted in a non-exhaustive fashion in the sole figure.

Such a method comprises at least three main steps (i) to (iii).

A first main step (i) consists of determining the position of the spot where a communication device EC is located.

This determination may be made by any means known to the person skilled in the art. Thus, it may be made by means of a positioning device EP, which potentially comprises the communication device EC. Such a positioning device EP may, for example, be a GPS (Global Positioning System) device. However, in one variant, it may be made by triangulation within the network RC or by detecting a connection within a micro- or femtocell of the network RC, for example. It should be noted that the technique used for this position determination may influence the accuracy of the later calculations that use these results.

It should also be noted that each first main step (i) may be performed either automatically at periodic intervals (i.e. at intervals predefined by the user), upon the request of the communication device's EC user when he or she wants to obtain a video recording of the spot where he or she is located, with proof of his or her presence if possible.

A second main step (ii) of the inventive method consists of determining whether there is at least one camera Ci capable of providing video recordings made within a part of an observation area that might include a spot determined is during a first main step (i), and accessible via the network RC.

It should be noted that it is the apparatus (for obtaining video recordings) D, according to the invention, which is tasked with performing that second main step (ii), and potentially with requesting the position of its communication device EC during the first main step (i), when it is not communicated automatically (in this case, by the positioning device EP).

This determination is done by sending a request, in this case to the information server SI, via the network RC and by means of the communication module MCN of the mobile communication device EC.

To that end, the apparatus D comprises search means MR tasked with making camera Ci determinations.

For example, the search means MR may compare the position of the communication device EC, which was determined during the first main step (i), at known positions of cameras CI which are stored in storage means MS1 of the information server SI as matches for the camera identifiers, in order to determine whether there is a camera Ci which might be located within the vicinity of the communication device EC. Next, if such a camera CI exists, the search means MR are operative to determine whether that camera CI offers an observation area which includes the communication device's EC determined position. Finally, if so, the search means MR are operative to perform the third main step (iii) that will be described later on, using the identifier of the camera Ci that was determined.

It should be noted that in order to make the determination of a camera Ci more accurate, it is particularly advantageous to also determine the communication device's EC trajectory during the first step (i).

To do so, one may, for example, use velocity data representative of the current velocity of the communication device EC, and orientation and direction data representative of the general orientation and direction followed by the communication device EC. This physical parameter data (speed, orientation, direction) may be provided by devices that the communication device EC comprises, such as, for example, an accelerometer AC and a compass BO, or by a positioning device used for geolocation (for example, a GPS device).

It should be noted that the positioning device EP and/or the accelerometer (or analog) AC and/or the compass (or analog) BO may potentially form part of the apparatus D.

It should be understood that when the search means MR have the position, velocity, orientation, and direction of the communication device EC, they may calculate its trajectory, and therefore, they may determine (during a second main step (ii)) if that trajectory will cross (or crosses) the observation area of a camera Ci. It is thereby possible to anticipate the visitation of a communication device EC within an observation area of a camera Ci in order to obtain in advance the right to use a portion of that camera's Ci video recording, or to notify the user of the communication device EC of the possibility of obtaining a portion of that camera's Ci video recording.

It should also be noted that the search means MR may be operative to determine, during a second main step (ii) the observation area of a camera Ci based on information data which relate to that camera Ci and/or to its environment. As previously indicated, this information data may be, for example, obtained from storage means MS1 of the information server SI at the same time as the position and identifier of the camera Ci in question.

It should be understood that once the search means MR have a camera's Ci position and information data, they can calculate, or at least estimate that camera's Ci observation area. The observation zone's determined accuracy, naturally, depends on the number and accuracy of a camera's Ci information data.

It should also be noted that the transmission of a part of a video recording may be contingent on meeting a predefined set of rule(s). If so, during the second main step (ii) the transmission of only a part of a video recording is only permitted if all of the predefined rule(s) have been met.

Any type of rule known to the person skilled in the art that exhibits a relationship with the obtaining of a video recording may be conceived. This way, it may, for example, be a local rule instituted due to a law and relating to the use of video recordings, or an authorization to use a video recording if and only if no third party is recognizable or when each third party has provided authorization to use video sequences in which it appears (potentially partially blurred), or a permission to use a video recording when the user of a communication device EC has an authorization to use video recordings that concern him or her (for example, because that user has an identifier stored in a list of authorized users), or it may be the providing, by the communication device EC, of an identifier previously provided when searching for information data related to a camera Ci and/or to its environment. In the case of the last rule mentioned, the identifier may, for example, by a token that is specifically assigned by the information server SI to a communication device EC when the communication device EC transmits to it a request intended to determine at least one identifier of a camera Ci whose position is in the vicinity of that communication device's EC position, and which is transmitted to that device (EC) in the message responding to its request.

A third main step (iii) of the inventive method consists, when a camera Ci has been determined (in this case, by search means MR), of transmitting to the communication device EC, upon its request and via the network RC, at least one part of the video recording made by that camera Ci while the communication device EC is in its observation area.

In the non-exhaustive example described here, the apparatus D comprises processing means MT which are tasked with generating a request containing at least the identifier of the determined camera Ci and a request to obtain a portion of a video recording starting at the current date and time, and with asking its communication device EC to transmit that request to the identified camera Ci. However, in one variant, the request may be transmitted to a storing server, in particular, that camera's Ci video recordings.

This request is sent via the network RC and by means of the communication module MCN of the mobile communication device EC.

It should be noted that during the third main step (iii), at least one processing of the requested video recording portion based on instructions that were provided by the communication device EC. That (or each) processing effort may potentially be performed within the camera Ci that was determined, whenever that camera Ci comprises a processing module MT1 operative for that purposes and when it also stores its video recordings. This is advantageous as it makes it possible to free up the apparatus D from one or more processing efforts. Furthermore, the definition of each requested processing effort may advantageously be transmitted in the request to obtain a video recording.

Any type of video image processing known to the person skilled in the art that is relatively fast and simple may be requested. Thus, it may, for example, be blurring the faces of people (or third parties) detected within the images of a video recording, manually and/or automatically selecting at least one sequence of a portion of a video recording (such as, for example, a summary) when that video lasts longer than a predefined threshold, deleting a portion of a video recording, or sharing a portion of a video recording with at least one third party.

The inventive method may advantageously comprise two other steps (iv) and (v).

More specifically, the fourth step (iv) consists of generating a piece of video content within the communication device EC based on a portion of a video recording that was obtained by transmission, and the fifth step (v) consists of providing a piece of video content that was generated during a fourth main step (iv) to a personal website of the user (stored, in this case, within the blog server SB), in view of making it available, potentially under chosen conditions.

Here, the term "video content" refers to a set of digital data defining a sequence of video images and placed in a format that makes it possible to add them to a blog and to make them usable by video players. Consequently, a piece of video content may be constituted by a video recording portion, potentially post-processing, or by digital data resulting from processing a downloaded video recording portion.

The conditions for making a piece of video content available, if any, are chosen by the user. For example, they form part of the policy for accessing his or her blog, which he or she predefined and which is in force, or access policies defined by a social networking site (such as Facebook) when the video is published by the user on a third-party service.

This fourth step (iv) is performed by the apparatus D, and more specifically by generation means MG that it comprises, and which are is operative to generate a piece of video content based on a video recording portion transmitted upon request to the communication device EC.

It should be noted that at least one processing effort may be performed within the communication device EC during that fourth step (iv). If so, the generation means MG are the ones which are preferably tasked with this processing.

As previously indicated, any type of video image processing known to the person skilled in the art, which is relatively fast and simple, may be performed by the generation means MG. This processing may potentially complement those performed within a camera Ci by the processing means MT1, if any. Consequently, it may, for example, be blurring the faces of people (or third parties) detected in the images of a downloaded video recording portion, manually and/or automatically selecting at least one sequence of a portion of a video recording (such as, for example, a summary) when that video lasts longer than a predefined threshold, deleting a portion of a video recording, or sharing a portion of a video recording with at least one third party.

Preferentially, and as depicted, the apparatus D comprises storage means MS5 wherein it stores the generated video content as well as potentially the downloaded video recording portions. This particularly makes it possible to perform additional processing, or more simply, the viewing of video content by the user when he or she so desires. This way, a user may, for example, put together a long video sequence with multiple pieces of video content, potentially to publish it in his or blog.

The storage means MS5 may appear in any form known to the person skilled in the art, and particularly in the form of a memory, computer file, or database.

The fifth step (v) is performed by the apparatus D, and more specifically by control means MC that it comprises and which are operative to order the communication device EC to provide a piece of video content which had been generated by the generation means MG to the personal website.

It should be noted that at least one of the steps (i) to (v) may be performed based on a set of instructions that had been predefined by the user of the communication device EC.

Any type of instruction known to the person skilled in the art that makes it possible to automate, potentially in a contextual fashion, a function or operation, may be used. This way, it may be data defining a determination period (launching the method), or a systematic storage of video recording portions, potentially after at least one predefined processing, a storage of video recording portions based on a predefined context, potentially after at least one predefined processing, and the automatic generating and providing of a piece of video content, potentially based on a predefined context. By way of a contextual example, it is conceivable that there might be an instruction that requests the storage of a video recording portion every time that the communication device EC is located in a new spot where it had never been before. It is conceivable that there might be an instruction requesting that the length of each video recording portion be shortened to about 10 seconds, potentially except when the communication device EC is located in a new spot where it had never been before, and if so, the duration is set to 30 seconds. It is also conceivable that there might be an instruction requesting that the method alone be launched when the communication device EC is located in a new spot where it had never been before, or in a predefined location. It is also conceivable that there might be an instruction requesting that the user's authorization always be obtained before ever downloading a video recording portion or before ever locally storing a downloaded video recording portion.

Preferentially, and as depicted, the apparatus D comprises storage means MS6 in which it stores each set of instructions predefined by the user. As a set's instructions may relate to multiple means (or modules) of the apparatus D, the storage means MS6 may therefore be accessible to each of its means (or modules).

These storage means MS6 may come in any form known to the person skilled in the art, and particularly in the form of a memory, a computer file, or (particularly for the rules) a database.

It should also be noted that the user of the communication device EC may be notified every time there is a video recording that concerns him or her. This may, for example, serve to notify him or her that it is providing an instruction requesting that the method continue, potentially under certain conditions, or that the method be stopped, or more simply to tell him or her that he or she will soon have access to new video content, potentially added to his or her blog or to a chosen social networking site, in accordance with the set of instructions that he or she predefined and which is in force.

The notifications may be, for example, generated by the control means MC. It should be noted that these means (MC) may potentially comprise a rules engine tasked with controlling the application of each instruction of the predefined set in force.

It should also be noted that all of the exchanges that took place between the user and the apparatus D (in both directions) are carried out via a human/machine interface IN which is preferentially part of the communication device EC. However, this human/machine interface IN may form part of the apparatus D.

It should also be noted that the apparatus D is preferentially carried out in the form of a combination of electronic circuit and software (or computer) modules. However, it may also be constructed in the form of software modules.

The invention offers several advantages, which include:
it may allow a user to be automatically alerted of the presence of any type of camera (wired or wireless), provided that the camera is recorded in a list and that its video recordings are accessible,
it may enable a user to be automatically alerted that a piece of video content has been obtained and stored,
it does not require any additional external equipment,
it makes it possible to enhance blogs with video content, and more generally speaking, social networks containing hybrid content (not just videos), potentially in a manner entirely automated by programming.

The invention is not limited to the embodiments of the apparatus for obtaining video recordings, user communication device, and method for obtaining video recordings described above, which are given only as examples; rather it encompasses all variants that the person skilled in the art may envision within the framework of the claims below.

The invention claimed is:

1. A method for obtaining video recordings related to a user who has a communication device capable of connecting to a wireless communications network, the method comprising:
   determining a position of a spot where said communication device is located,
   determining whether there is at least one camera capable of providing video recordings, a part of an observation area of which might include said determined spot and which is accessible via said communications network,
   in the event that such a camera is determined to exist, determining whether the identified camera offers an observation area that includes said determined position, and if so
   transmitting to said communication device, via said communications network, at least one portion of a video recording made by the identified camera during a period of time said communication device is in its observation area, wherein at least one processing effort of said video recording portion is performed based on instructions provided by said communication device and wherein said processing effort is chosen from a group comprising at least one of face-blurring of people detected within the images of the video recording, manually and/or automatically selecting at least one sequence of a portion of a video recording when that portion lasts longer than a predefined threshold, deleting a portion of a video recording, and sharing a portion of a video recording with at least one third party.

2. The method according to claim 1, wherein said determined position is compared to known positions of cameras stored within a storage device in association with camera identifiers in order to determine whether there is a camera within a vicinity of said communication device, then, if such a camera exists, determining an observation area of the identified camera and determining if the observation area includes said determined position, and if so, the method is carried out using the determined camera's identifier.

3. The method according to claim 1, wherein, a trajectory of said communication device is also determined, and it is determined whether that trajectory will cross said observation area, given said determined position.

4. The method according to claim 1, wherein within which a piece of video content is generated within said communication device based on said transmitted video recording portion, and said generated video content is provided to a personal website of said user in view of making it available, potentially under chosen conditions.

5. The method according to claim 1, wherein said determining the position is automatically performed at periodic intervals.

6. The method according to claim 1, wherein said determining the position is performed upon the request of the user of said communication device.

7. The method according to claim 1, wherein at least one portion of the method is performed based on a set of instructions predefined by the user of said communication device.

8. The method according to claim 7, wherein said instructions are chosen from a group comprising at least one determination period, a systematic storage of video recording portions, potentially after at least one predefined processing, a storage of video recording portions based on a predefined context, potentially after at least one predefined processing, and the automatic generating and providing of a piece of video content, potentially based on a predefined context.

9. The method according to claim 1, wherein a camera's observation area is determined based on information data related to that camera and/or to its environment.

10. The method according to claim 9, wherein said information data comprises at least one of the camera's aperture angle, the height at which the camera is affixed, the camera's tilt with respect to a horizontal plane, the camera's swivel with respect to a vertical plane and the configuration of the environment in which the camera is installed.

11. The method according to claim 1, wherein at least one processing effort is performed within said determined camera based on instructions transmitted by said communication device.

12. The method according to claim 6, wherein at least one processing effort is performed within said communication device.

13. The method according to claim 1, wherein in the presence of a camera transmitting its video recordings to a centralized storage device, the video recording of the identified camera is searched for within the centralized storage device.

14. The method according to claim 1, wherein in the presence of the identified camera storing its video recordings, the video recording is searched for within that camera.

15. The method according to claim 1, wherein the user of said communication device is notified when there is a video recording concerning the user.

16. The method according to claim 1, wherein the transmission of a portion of a video recording is authorized when at least one condition of a predefined set of at least one rule is met.

17. The method according to claim 16, wherein at least one rule of the predefined set of at least one rule is chosen from a group comprising: at least one instituted local rule that relates to the use of video recordings, an authorization to use a video recording in the absence of recognizable third parties or, if permission is provided by a recognizable third party, an authorization to use a video recording when the user of a communication device has a permission to use video recordings that concern him or her, and the providing, by the communication device, of an identifier previously provided when searching for information data related to a camera and/or to that camera's environment.

18. A method for obtaining video recordings related to a user who has a communication device capable of connecting to a wireless communications network and whose position can be determined, which the method comprises the following comprising:

determining the a position of the a spot where said communication device is located, determining whether there is at least one camera capable of providing video recordings, a part of an observation area that of which might include said determined spot, and which is accessible via said communications network, in the event that such a camera is determined to exist, determining whether the camera offers an observation area that includes said determined position, and if so transmitting to said communication device, via said communications network, at least one portion of a video recording made by that camera during a period of time said communication device is in its observation area, wherein the transmission of a portion of a video recording is authorized when at least one condition of a predefined set of at least one rule is met and, wherein at least one rule of the predefined set of at least one rule is chosen from a group comprising: at least one instituted local rule that relates to the use of video recordings, an authorization to use a video recording in the absence of recognizable third parties or, if permission is provided by a recognizable third party, an authorization to use a video recording when the user of a communication device has a permission to use video recordings that concern him or her, and the providing, by the communication device, of an identifier previously provided when searching for information data related to a camera and/or to that camera's environment.

19. An apparatus for obtaining video recordings made by cameras, for a communication device capable of connecting to a wireless communications network and whose position is determinable, said apparatus comprising:

at least one processor operative to determine whether there is at least one camera capable of providing video recordings, a part of an observation area of which may include a spot where said communication device is located, accessible via said communications network, and operative, if such a camera is identified, to request a transmission to said communication device, via said communications network, of at least a portion of a video recording made by said identified camera while said communication device is within its observation area, to perform at least one processing effort of said video recording portion based on instructions provided by said communication device and wherein said processing effort is chosen from a group comprising at least one of face-blurring of people detected within the images of the video recording, manually and/or automatically selecting at least one sequence of a portion of a video recording when that portion lasts longer than a predefined threshold, deleting a portion of a video recording, and sharing a portion of a video recording with at least one third party.

20. The apparatus according to claim 19, wherein the at least one processor is operative to generate a piece of video content based on a video recording portion transmitted upon request to said communication device, and operative to order said communication device to provide a generated piece of video content to a chosen website in view of making it available, potentially under chosen conditions.

21. A communication device capable of connecting to a wireless communications network, whose position is determinable, and comprises a device for obtaining video recordings according to claim 19.

22. An apparatus for obtaining video recordings made by cameras, for a communication device capable of connecting to a wireless communications network and whose position is determinable, said apparatus comprising:

at least one processor operative to determine whether there is at least one camera capable of providing video recordings, a part of an observation area of which may include a spot where said communication device is located, accessible via said communications network, and operative, if such a camera is identified, to request a transmission to said communication device, via said communications network, of at least a portion of a video recording made by said identified camera while said communication device is within its observation area, wherein the transmission of a portion of a video recording is authorized when at least one condition of a predefined set of at least one rule is met, wherein at least one rule of the predefined set of at least one rule is chosen from a group comprising: at least one instituted local rule that relates to the use of video recordings, an authorization to use a video recording in the absence of recognizable third parties or, if permission is provided by a recognizable third party, an authorization to use a video recording when the user of a communication device has a permission to use video recordings that concern him or her, and the providing, by the communication device, of an identifier previously provided when searching for information data related to a camera and/or to that camera's environment.

* * * * *